Patented Sept. 1, 1936

2,052,694

UNITED STATES PATENT OFFICE 2,052,694

TOOTH PASTE AND PROCESS FOR MAKING SAME

Philip J. Breivogel, Glen Ridge, N. J., assignor to William R. Warner & Co., Inc., New York, N. Y., a corporation of New York No Drawing. Application March 31, 1934, Serial No. 718,437

12 Claims. (Cl. 167—93)

This invention relates to tooth pastes in general and more especially to an improved sodium perborate containing tooth paste.

The medicinal value of sodium perborate in tooth pastes as a disinfectant and as the medicament for the treatment of Vincent's angina is well recognized.

There are at least two kinds of sodium perborates, to wit the monohydrate and the tetrahydrate which according to the present invention can be successfully used as an ingredient of a tooth paste having remedial properties for the treatment of trench mouth or the like when used as a dentifrice by a person afflicted with this condition. In the practice heretofore, difficulty has been encountered in forming a tooth paste having sodium perborate as an ingredient due to the fact that these perborates will decompose at elevated temperatures, particularly in the presence of moisture, as an instance the tetrahydrate would freely decompose at about forty degrees centigrade or one hundred and four degrees Fahrenheit while the monohydrate would begin to decompose at about forty-five degrees centigrade or one hundred and thirteen degrees Fahrenheit. As aforesaid, this decomposition was facilitated at elevated temperatures when the perborates were disposed in the presence of moisture or moisture liberating bodies. Furthermore, this difficulty, as an instance, was not overcome when the tetrahydrate was sealed in an air-tight tube, its own water of crystallization being sufficient to start decomposition in such case.

The mere admixture of petrolatum jelly with the tetrahydrate furthermore did not deter this decomposition when a temperature of forty degrees centigrade or one hundred and four degrees Fahrenheit was reached. Aside from the foregoing, petrolatum jelly had the other disadvantage that it would not emulsify readily and would produce a greasy preparation.

In view of the foregoing, it is an object of the present invention to provide an improved tooth paste containing sodium perborate and a vehicle such as liquid petrolatum which will emulsify more easily than a mixture containing petrolatum jelly and will not give a greasy preparation.

It is still another object of the present invention to provide an improved sodium perborate tooth paste having a vehicle such as liquid petrolatum mixed with ceresin which will produce a product resembling a mixture containing petrolatum jelly in appearance but emulsify more readily than a mixture containing petrolatum jelly and which will not give a greasy preparation.

Among the objects of the present invention, it is also aimed to provide a sodium perborate tooth paste containing liquid petrolatum as a vehicle, colloidal kaolin or the like as a body supplying ingredient and sodium lauryl sulphate or the like in which the sodium lauryl sulphate or the like in place of a soap or gum will contribute to form a tooth paste which is superior as a wetting agent than a paste containing soap or the like, which will not precipitate from solution as readily as soap in the presence of a salt, such as sodium perborate, which will not have the same tendency to cause decomposition as a soap and which will not cause the tooth paste unduly to solidify as will happen when soap is used with a filler, such as calcium sulphate, calcium phosphate, magnesium carbonate and the like.

It is still another object of the present invention to provide a sodium perborate tooth paste containing sodium perborate that is rich in oxygen and rather stable at elevated temperatures, as for instance, sodium perborate monohydrate which will ordinarily not decompose at a temperature lower than forty-five degrees centigrade or one hundred and thirteen degrees Fahrenheit equal to a temperature rarely reached in the hottest weather of the temperate zones.

It is still another object of the present invention to provide an improved process for making a sodium perborate tooth paste having a vehicle, a body supplying constituent and an emulsifier in which the sodium perborate component is introduced into the mixture in a cold state.

It is still another object of the present invention to provide an improved process for making a sodium perborate tooth paste including ceresin, a liquid petrolatum and an emulsifier in which the liquid petrolatum, ceresin and the emulsifier may be mixed upon the application of heat, the mixture then cooled to a temperature below the decomposition temperature of the sodium perborate and then the sodium perborate introduced in a comparatively cold state.

A statisfactory sodium perborate tooth paste was produced when using the following ingredients in the proportions indicated:

| | Parts |
|---|---|
| Sodium perborate tetrahydrate $NaBO_3 4(H_2O)$ | 65 |
| Liquid petrolatum specific gravity .83 | 90 |
| Colloidal kaolin | 12 |
| Powdered soap | 9 |
| Flavoring: | |
|    Saccharine ½ part | |
|    Oil of wintergreen 2 parts | 2.5 |

In the foregoing mixture, the medicinal value was of course contributed by the sodium perborate. The liquid petrolatum served as the vehicle. The colloidal kaolin served as the body forming component and the powdered soap as the emulsifier.

By changing the relative proportions of the several ingredients of the aforesaid mixture, liquid petrolatums of other specific gravities can be used without materially changing the product. It has also been found that in place of the colloidal kaolin, satisfactory results were obtained with substances, such as bentonite clay, fuller's earth and the like.

In place of the powdered soap, there could be substituted sodium lauryl sulphate preferably with cetyl alcohol which would be superior as a wetting agent, would not precipitate from solution as readily as a soap in the presence of a salt, such as sodium perborate, would not have as great a tendency to cause decomposition of such salt as would be the case with a soap, and would not cause the tooth paste unduly to solidify as would be the case with soap in the presence of fillers, such as calcium sulphate, calcium phosphate, magnesium carbonate and the like.

It was also found that a far superior mixture was produced when there was used a sodium perborate which had a relatively greater amount of oxygen, and which was more stable at elevated temperatures than the tetrahydrate aforesaid. An exceedingly satisfactory product was produced with the monohydrate so substituted with the following ingredients in the proportions mentioned:

| | Parts |
|---|---|
| Sodium perborate monohydrate $NaBO_3$ ($H_2O$) | 30 |
| Colloidal kaolin | 24 |
| Light liquid petrolatum specific gravity .83 | 27 |
| Sodium lauryl sulphate | 3.5 |
| Cetyl alcohol | 3.5 |
| Flavoring: | |
| Saccharine ½ part | |
| Oil of wintergreen 2 parts | 2.5 |

In the latter mixture, it was found that equally satisfactory results are produced when the sodium lauryl sulphate was replaced by sodium cetyl sulphate or the like.

It was also found that an equally satisfactory result was produced when the cetyl alcohol was replaced by lauryl alcohol or other higher alcohols with the present mixture.

It was also found that satisfactory results could also be produced if the colloidal kaolin was replaced by bentonite clay, magnesium stearate, magnesium carbonate, calcium sulphate, calcium phosphate, fuller's earth and the like.

It was also found that by changing the relative proportions of the ingredients of the aforesaid mixture, liquid petrolatums of different specific gravities could be used. As an instance, when a liquid petrolatum having a specific gravity of .89 was used, an excellent mixture was produced with the several ingredients in the following proportions:

| | Parts |
|---|---|
| Sodium perborate monohydrate $NaBO_3$ ($H_2O$) | 30 |
| Colloidal kaolin | 16 |
| Heavy liquid petrolatum specific gravity .89 | 35 |
| Sodium lauryl sulphate | 3.5 |
| Cetyl alcohol | 3.5 |
| Flavoring: | |
| Saccharine ½ part | |
| Oil of wintergreen 2 parts | 2.5 |

When it is desired not to use colloidal kaolin as the body contributing component, ceresin can be used to advantage preferably by changing the proportions of the aforesaid ingredients to correspond to the following:

| | Parts |
|---|---|
| Sodium perborate monohydrate $NaBO_3$ ($H_2O$) | 26 |
| Heavy liquid petrolatum specific gravity .89 | 40 |
| Ceresin | 10 |
| Sodium lauryl sulphate | 3 |
| Cetyl alcohol | 5 |
| Flavoring: | |
| Saccharine ½ part | |
| Oil of wintergreen 2 parts | 2.5 |

By using ceresin with mineral oil as aforesaid, there is obtained a product resembling petrolatum jelly in appearance but with different properties. As an instance, petrolatum jelly emulsifies with difficulty and forms a greasy product while the aforesaid preparation made from liquid petrolatum and ceresin emulsifies very readily and does not yield a greasy preparation when used in a tooth paste.

The several ingredients may be replaced as hereinbefore set forth. Furthermore a liquid petrolatum of a different specific gravity may be used without materially changing the characteristic of the tooth paste, preferably when changing the proportions of the several ingredients. As an instance, a liquid petrolatum having a specific gravity of .83 can be used to advantage in the latter mixture when the proportions are substantially as follows:

| | Parts |
|---|---|
| Sodium perborate monohydrate $NaBO_3$ ($H_2O$) | 38 |
| Ceresin | 11 |
| Liquid petrolatum specific gravity .83 | 44 |
| Sodium lauryl sulphate | 4.5 |
| Cetyl alcohol | 6.0 |
| Flavoring: | |
| Saccharine ½ part | |
| Oil of wintergreen 2 parts | 2.5 |

Still furthermore, colloidal kaoline may be added to the latter mixture without materially changing the characteristic of the same when the proportions of the several ingredients are changed as follows:

| | Parts |
|---|---|
| Sodium perborate monohydrate $NaBO_3$ ($H_2O$) | 33.2 |
| Light liquid petrolatum specific gravity .778 | 40 |
| Ceresin | 23 |
| Colloidal kaolin | 5 |
| Sodium lauryl sulphate | 4 |
| Cetyl alcohol | 6 |
| Flavoring: | |
| Saccharine ½ part | |
| Oil of wintergreen 2 parts | 2.5 |

It has become the custom to add a flavoring to a tooth paste, especially to satisfy the fastidious while of course not an essential as an ingredient of a tooth paste. In the aforesaid formulas, one type of flavoring has been listed consisting of approximately two and a half parts to the mass in which one-half part consists of saccharine and two parts consist of oil of wintergreen. It is of course obvious that this flavoring may be changed to meet different tastes and that the amount of a particular flavoring in proportion to a particular mass may similarly be changed to meet a particular taste without departing from the general spirit of the invention.

With all of the aforesaid examples of mixtures for producing a sodium perborate tooth paste with the exception of the last three in which ceresin is an ingredient, the several elements are mixed in the cold state, in the case of the sodium perborate tetrahydrate at least at a temperature lower than forty degrees centigrade or one hundred and four degrees Fahrenheit and in the case of the sodium perborate monohydrate at a temperature below forty-five degrees centigrade or one hundred and thirteen degrees Fahrenheit to avoid decomposing the sodium perborate while mixing the several ingredients.

In the last three examples in which ceresin is introduced, it is desirable to add the ceresin before the sodium perborate is added and then to heat the mixture to a temperature of about seventy degrees centigrade, thereafter to cool the mixture to a temperature at least lower than forty degrees centigrade or one hundred and four degrees Fahrenheit when sodium perborate tetrahydrate is used and to cool the mixture to a temperature at least lower than forty-five degrees centigrade or one hundred and thirteen degrees Fahrenheit when sodium perborate monohydrate is used before adding the sodium perborate in order to avoid decomposing the sodium perborate while so mixing the several ingredients.

It is obvious that various changes and modifications may be made in the details of a tooth paste made according to the present invention and in the steps of the process for producing such tooth paste without departing from the general spirit of the invention set forth in the appended claims.

I claim:

1. A tooth paste consisting of a mixture of sodium perborate salt, a liquid petrolatum, a body supplying component, an emulsifying agent consisting of sodium lauryl sulphate, and alcohols of higher molecular weight.

2. A tooth paste consisting of a mixture of sodium perborate salt, a liquid petrolatum, a body supplying component, an emulsifying agent consisting of sodium cetyl sulphate, and alcohols of higher molecular weight.

3. A tooth paste consisting of a mixture of sodium perborate salt, a liquid petrolatum, kaolin, an emulsifying agent consisting of sodium lauryl sulphate, and alcohols of higher molecular weight.

4. A tooth paste consisting of a mixture of sodium perborate salt, a liquid petrolatum, bentonite clay, an emulsifying agent consisting of sodium lauryl sulphate, and alcohols of higher molecular weight.

5. A tooth paste consisting of a mixture of sodium perborate monohydrate, a liquid petrolatum, colloidal kaolin, an emulsifying agent consisting of sodium lauryl sulphate, and alcohols of higher molecular weight.

6. A tooth paste consisting of a mixture of thirty parts by weight of sodium perborate monohydrate, twenty-seven parts by weight of liquid petrolatum, twenty-four parts by weight of a body supplying component, three and a half parts by weight of sodium lauryl sulphate, and three and a half parts by weight of cetyl alcohol.

7. A tooth paste consisting of a mixture of thirty parts by weight of sodium perborate monohydrate, twenty-seven parts by weight of liquid petrolatum having a specific gravity of about .83, about twenty-four parts by weight of colloidal kaolin, three and a half parts by weight of sodium lauryl sulphate, three and a half parts by weight of cetyl alcohol, and two and a half parts by weight or less of a flavoring.

8. A tooth paste consisting of a mixture of sodium perborate salt, a liquid petrolatum, ceresin, an emulsifying agent consisting of sodium lauryl sulphate, and alcohols of higher molecular weight.

9. A tooth paste consisting of a mixture of sodium perborate salt, liquid petrolatum, a body supplying component such as colloidal kaolin and ceresin, an emulsifying agent consisting of sodium lauryl sulphate, and alcohols of higher molecular weight.

10. A tooth paste consisting of a mixture of about twenty-six parts by weight of sodium perborate monohydrate, about forty parts by weight of heavy liquid petrolatum having a specific gravity of about .89, about ten parts by weight of ceresin, about three parts by weight of sodium lauryl sulphate, and five parts by weight of cetyl alcohol.

11. A tooth paste consisting of a mixture of about thirty-three and one-fifth parts by weight of sodium perborate monohydrate, about forty parts by weight of light liquid petrolatum having a specific gravity of .778, about twenty-three parts by weight of ceresin, about five parts by weight of colloidal kaolin, about four parts by weight of sodium lauryl sulphate, and about six parts by weight of cetyl alcohol.

12. The process of making a tooth paste consisting in mixing sodium perborate monohydrate at a temperature of less than forty-five degrees centigrade into a mixture of liquid petrolatum, a body supplying component consisting of colloidal kaolin, an emulsifying agent consisting of sodium lauryl sulphate, and alcohols of higher molecular weight.

PHILIP J. BREIVOGEL.